United States Patent [19]

Horne et al.

[11] Patent Number: 4,694,491

[45] Date of Patent: Sep. 15, 1987

[54] CRYPTOGRAPHIC SYSTEM USING INTERCHANGEABLE KEY BLOCKS AND SELECTABLE KEY FRAGMENTS

[75] Inventors: Donald R. Horne, Don Mills; John M. Jeffers, Downsview, both of Canada

[73] Assignee: General Instrument Corp., New York, N.Y.

[21] Appl. No.: 710,385

[22] Filed: Mar. 11, 1985

[51] Int. Cl.⁴ ..................... H04N 7/167; H04N 7/00; H04N 7/10

[52] U.S. Cl. ..................................... 380/20; 380/19; 380/15; 358/84

[58] Field of Search ............... 358/120, 121, 122, 123, 358/124, 84; 178/22.04, 22.05, 22.06, 22.13, 22.14, 22.16, 22.15

[56] References Cited

U.S. PATENT DOCUMENTS

| | | | |
|---|---|---|---|
| 4,264,781 | 4/1981 | Oosterbahn et al. | 178/22.16 |
| 4,322,577 | 5/1982 | Brändström | 178/22.05 |
| 4,341,925 | 7/1982 | Doland | 178/22.16 |
| 4,388,643 | 6/1983 | Aminetzah | 358/122 |
| 4,447,828 | 5/1984 | den Toonder | 358/118 |
| 4,484,027 | 11/1984 | Lee et al. | 178/22.15 |
| 4,549,308 | 10/1985 | LoPinto | 178/22.14 |
| 4,551,580 | 11/1985 | Cox et al. | 178/22.04 |

FOREIGN PATENT DOCUMENTS 0123360 10/1984 Netherlands.
8500718 2/1985 United Kingdom.

*Primary Examiner*—Stephen C. Buczinski
*Assistant Examiner*—Melissa L. Koltak
*Attorney, Agent, or Firm*—James & Franklin

[57] ABSTRACT

A cryptographic system is used for the secure transmission of digitized signals to a plurality of receivers. At the transmission end, a key consisting of two blocks, each including a plurality of key fragments, is generated. For each transmission session, different sets of key fragments may be periodically selected from one of the key blocks and used to encrypt the signals. Data indicative of the set selection is generated. The key is distributed to each receiver. The set selection data is transmitted to all receivers along with the encrypted signals and used to construct the key fragment set for decryption of the transmitted signals. During the transmission session, the other key block may be varied to form a replacement key which is distributed to each receiver. At the end of the session, the functions of the key blocks are interchanged in all receivers at one time by selecting a set in the varied key block for use in encryption and decryption.

31 Claims, 4 Drawing Figures

CRYPTOGRAPHIC SYSTEM USING INTERCHANGEABLE KEY BLOCKS AND SELECTABLE KEY FRAGMENTS

The present invention relates to cryptographic systems and, more particularly, to a cryptographic system for use in a signal distribution system such as a direct broadcast satellite communication network which utilizes periodically rearrangeable key fragments for increased agility and interchangeable key blocks to facilitate the distribution of replacement keys.

The availability of small, low-cost television receive-only terminals in recent years has resulted in an increasing demand for direct broadcast satellite services. Such services include Pay TV, tele-conferencing, tele-seminar, private broadcast networks, and the like.

Unlike land lines and terrestrial microwave links, satellite transmissions lack privacy. Such transmissions can be received by any TV receive-only terminal whose antenna is situated to receive the satellite signals. Accordingly, the secure transmission of video and audio programming and data signals is required to provide the privacy essential to many applications.

A simple example of a direct broadcast satellite network in which security is required is one which broadcasts television signals to paying subscribers. Since any receiver having an antenna in the broadcast signal area can receive the satellite signals, it is necessary that the signals be encoded in a way which can be decoded only by subscribers' receivers. Certain subscribers may have paid for certain programs or program groups, whereas others may have paid for other programs or program groups. The signals must then be further encoded such that subscribers who have paid for particular programs or groups of programs can receive same, while other subscribers cannot.

In the direct broadcast satellite service in which the cryptographic system of the present invention is used, the video signals are processed and transmitted in analog form. Audio signals are digitized and transmitted in digital data form. Addressable control data is organized into packets according to address and transmitted in the same digital form as the audio signals. All of the signals are combined in baseband using time-division-multiplex techniques. The combined baseband signal is then transmitted over the satellite link to subscribers' receivers using FM modulation.

In general, the transmission end equipment consists of a program processing unit and a real time controller. The program processing unit performs video signal processing and scrambling, audio digitization, encryption of the audio data and baseband signals time multiplexing. The real time controller generates the audio cryptographic keys, encrypts the addressable control messages, generates the packet messages in accordance with the transmission protocol, maintains the user data base and communicates with other processing units.

The receiving end equipment includes an addressable controller-decoder designed for use with a receiver which has the necessary interface for interaction with the decoder. The addressable controller-decoder demultiplexes the baseband signal, controls the receiver, descrambles the video signal, decrypts the audio data, and converts the audio data into analog form.

The baseband signal utilizes a composite video signal format which includes active video portions and horizontal blanking interval portions. The two audio channels and control data channel occupy a portion of the time normally allotted to the horizontal blanking interval. The video frame synchronization information and the zero level reference are transmitted during the vertical blanking interval. The audio data and the control data are transmitted in a burst, synchronous mode. The data is non-returnable to zero binary encoded.

A two-level video scrambling screen is used. The first level is achieved by removing the line and frame synchronization pulses completely from the video signal. A unique sync word is transmitted in the vertical blanking interval for synchronization purposes. The addressable controller-decoder establishes synchronization by searching and locating the sync word. Once the sync word is located, all the sync pulses are reconstructed with reference to the sync word. This technique is used in conjunction with video signal inversion, which is the second security level. The sequence of video inversion is controlled by a binary bit stream at the transmitting end. The same bit stream is used to recover the inverted signal at the receiving end.

Unlike video scrambling, a highly secure audio encryption system can be achieved relatively inexpensively. The decryption circuit, being totally digital, can be implemented using semi-custom or custom integrated circuits.

The system uses an encryption scheme in which the clear audio bit stream is combined with the bit stream generated by a stream cipher using an exclusive OR operation. The receiving end decrypts the audio bit stream using the same stream cipher bit stream. The stream cipher bit stream is generated by a set of key fragments selected from the current key block of a double length common audio key and an initializing vector. The algorithm for generating the bit stream is secret. The entire common audio key is distributed to each receiver in encrypted form through the control data channel. One key block of the key is designated as the current key block and used for the duration of the communication session. The initializing vector is used for the duration of each video frame and is transmitted in the clear form in the horizontal blanking interval. Extremely low error rate for the initializing vector is achieved by transmitting each bit many times.

The addressable control data is organized into data blocks of 128 bits each. This channel carries much sensitive information in encrypted form such as audio decryption key information and authorization tier levels. The system is designed to prevent an eavesdropper from receiving the correct information and to prevent a legitimate receiver from receiving more information than is authorized. In part, this is achieved by encrypting the common audio key differently for each receiver. In this way, even in the unlikely event that an encrynted key is compromised, damage is limited because each encrypted key is usable only on a single receiver. Further, security is obtained because the key fragments in use can be rearranged periodically and new keys can be distributed and used for each transmission session.

The common audio key is encrypted for each receiver using a secret block cipher based on a unique key. The key has 64 bits which are assembled from 128 bits of stored information. When compared with the conventional Data Encryption Standard algorithm, the present block cipher has a larger block and a longer key. Accordingly, brute force attacks on the cipher will take considerably more effort.

The details of the direct broadcast satellite network in which the cryptographic system of the present invention is used, including an explanation of the transmission end equipment, the functioning of the terminal end equipment and the signal transmission system employed for communications between the two are set forth in co-pending U.S. patent application Ser. No. 548,357 filed Nov. 3, 1983 now U.S. Pat. No. 4,599,647 in the names of Ashok George and John Jeffers, entitled "Receiver With Interface For Interaction With Controller-Decoder" and U.S. patent application Ser. No. 729,290 filed on May 1, 1985 in the names of Joseph Glaab, Donald Horne, John Jeffers, and Wayne Mundy, entitled "Direct-Broadcast Satellite Signal Transmission System." In addition, an explanation of the basic cryptographic system used in the direct broadcast satellite network can be obtained from co-pending U.S. patent application Ser. No. 665,114 filed Oct. 26, 1984 in the name of Donald Horne, and entitled "Cryptographic System For Direct Broadcast Satellite Network." All of the above applications are assigned to the assignee herein.

The present invention relates to two improvements in the basic cryptographic system described in the above-identified United States application. The first improvement relates to the use of periodically rearrangeable key fragments for improved agility.

It is desirable, for security purposes, to be able to conveniently and rapidly alter the keys in the cryptographic system. Key alterations create a moving target which makes it more difficult to defeat the system, as compared to a static system.

This aspect of the present invention involves a cryptographic system in which selected fragments of the keys which are provided to the receivers are arranged and used for decryption at a given time. Periodically, the key fragment selection and order may be altered. For purposes of this application, the term "fragment" is used to denote any part or portion, such as a byte or set of bits, of the digital key information from which the actual key needed for decryption is constructed.

Each subscriber receiver unit utilizes two different key fragment sets in the decryption of the broadcast signals. One set of key fragments is selected from a common audio key distributed in encrypted form. This set of fragments is used to decrypt the broadcast signal. The other set of fragments is selected from a key stored in the memory of the receiver. The stored key is different for each receiver and pre-loaded in the receiver memory at the factory. The fragments from the stored key are used to decrypt the common audio key. Fragment set selection data is transmitted to the receiver units to define the selection and order of fragments of each key to be used to construct the actual decryption keys.

With this system, the actual decryption keys can be altered without distributing new keys. Instead, different key fragments are periodically selected and/or rearranged to form sets which are the new actual decrypting keys. As used herein, the term "set" means any ordered group of one or more key fragments. Different arrangements of the same fragments are considered different sets.

A second aspect of the present invention relates to the manner in which new or replacement keys are distributed. The common audio key is "individualized" for each receiver by encrypting it using the unique key stored in the particular receiver. Thus, a differently encrypted common audio key must be distributed to each receiver separately. The key is distributed periodically, preferably at least once during each transmission session, and retained in a memory in each receiver unit. Since the network is designed to service millions of subscribers, the distribution time for a new common audio key would be several hours. A relatively long distribution time creates an operational problem because, during changeover, a large number of receiver units having the new key will be unable to process program information encrypted with the old key.

The present invention overcomes this problem through the use of a common audio key of double length, that is, with two blocks or sections, each containing enough key fragments for construction of a key fragment set for decryption. Only one key block, the current key block, is designated for use in decrypting during a particular transmission session. The other key block, the variable key block, is not used for encrypting or decrypting during the transmission session, but is instead varied. The encrypted new audio keys, with the varied key block, are distributed to and stored in all receivers during the transmission session. The new key replaces the old key in each subscriber unit. The replacement key has a block which is identical to the current block of the old key. Since the current key block of the old current key and the corresponding key block of the replacement key are identical, no discontinuity of operation occurs as the new key replaces the current key.

Upon command in the form of updated key fragment set selection data, which is simultaneously distributed to all receivers at the end of the transmission session, the functions of the key blocks are interchanged and all receiver units switch over to use the varied key block of the replacement key for decrypting at the same time. Simultaneously, the circuit encrypting the broadcast signals switches over to the varied key block. Thus, although the distribution of the replacement key still requires several hours, all subscriber units are switched over to the new key at the same time.

It is, therefore, a prime object of the present invention to provide a cryptographic system for use in a direct broadcast satellite network wherein a periodically rearrangeable selection of key fragments is used to enhance cryptographic agility.

It is another object of the present invention to provide a cryptographic system for use in a direct broadcast satellite network in which subscriber receiver units can all be switched over to a new, previously distributed, key at the same time.

It is another object of the present invention to provide a cryptographic system for use in a direct broadcast satellite network wherein selected sets of key fragments are used to construct the actual decryption keys.

It is another object of the present invention to provide a cryptographic system for use in a direct broadcast satellite network wherein the broadcast signal contains information which each receiver unit utilizes to select and arrange key fragments for use in decryption of the broadcast signals.

It is another object of the present invention to provide a cryptographic system for use in a direct broadcast satellite network which employs dual key blocks, one of which is utilized in current decryption, while the other is varied.

It is another object of the present invention to provide a cryptographic system for use in a direct broadcast satellite network which employs dual key blocks and in which all receiver units are switched from the one key block to the other key block at the same time.

It is another object of the present invention to provide a cryptographic system for use in a direct broadcast satellite network which employs dual key blocks for rapid key changeover and a changeable selection of key fragment sets for increased agility.

It is another object of the present invention to provide a cryptographic system for use in a direct broadcast satellite network for the reliable secure transmission of audio and control signals.

In accordance with one aspect of the present invention, a cryptographic system is provided for the secure transmission of information between first and second nodes. The system comprises, at the first node, means for generating a key comprising more than one key fragment. Means are provided for selecting one or more of the key fragments to form a key fragment set. Means are provided for generating data indicative of the selected key fragment set. Means are provided for encrypting the information to be transmitted using the selected key fragment set. The encrypted information, key information, and select data are transferred from the first node to the second node. At the second node, means are provided for obtaining the selected key fragment set from the transferred key information in accordance with the transferred select data and for decrypting the encrypted information using the obtained key fragment set.

In accordance with a second aspect of the present invention, a cryptographic system for the secure transmission of information between first and second nodes is provided. The system comprises, at the first node, means for generating a key comprising first and second blocks. Means are provided for designating one key block as the current key block for encryption and decryption. Means are provided for varying the other key block. Thereafter, the varied key block is designated as the current key block. Means are provided for generating data indicative of the then current key block. Means are provided for encrypting the information to be transmitted using the then current key block. The encrypted information, key information, and selected data are transferred from the first node to the second node. At the second node, means are provided for obtaining the then current key block from the transferred key information in accordance with the transferred select data. Means are provided for decrypting the encrypted information using the obtained current key block.

In accordance with another aspect of the present invention, a cryptographic system is provided for the secure transmission of information between first and second nodes. The system comprises, at the first node, means for generating a key comprising first and second blocks, each block comprising more than one key fragment. Means are provided for designating one of the key blocks as the current key block for encrypting and decryption. Means are provided for selecting one or more key fragments from the current key block to form a key fragment set. Means are provided for varying the other key block. Thereafter, the designation means designates the varied key block as the current key block. Means are provided for generating data indicative of the selected key fragment set of the then current key block. The encrypted information, key information and select data are transferred from the first node to the second node. At the second node, means are provided for obtaining the then current selected key fragment set of the key block from the transferred key information in accordance with the transferred select data. Means are provided for decrypting the encrypted information using the obtained key fragment set.

In accordance with another aspect of the present invention, a receiver is provided for use with a signal broadcast system. The broadcast signal includes information encrypted with a set of key fragments selected from a plurality of key fragments, encryption key information, and set selection data. The receiver comprises means for receiving the encrypted information, key information, set select data, means for obtaining a key fragment set from the key information in accordance with the select data, and means for decrypting the encrypted information using the obtained key fragment set.

In accordance with another aspect of the present invention, a receiver is provided for use with a signal broadcast system. The broadcast signal includes information encrypted using a current designated key block from a dual block key. while the other key block is varied and, thereafter, designated as the current key block, and data indicative of the then current key block. The receiver comprises means for receiving the encrypted information, key information and data, means for obtaining the then current key block from the key information in accordance with the received data, and means for decrypting the encrypted information using the obtained current key block.

The system further comprises means, at the first node, for encrypting the key to provide the key information and means, at the second node, for decrypting the key information. The key encryption means comprises means for generating a second key comprising more than one key fragment and means for selecting one or more of the second key fragments to form a second key fragment set. Means are provided for generating second data indicative of the second selected key fragment set. Means are provided for transferring the second select data from the first node to the second node.

The key decryption means comprises means for storing the second key. Means are provided for obtaining the selected key fragment set from the stored second key using the second select data. Means are provided for decrypting the encrypted key using the obtained second key fragment set.

The means for generating the second key preferably comprises means for storing a third key and means for storing a number associated with the second node. Means are provided for encrypting the number with the third key to obtain the second key.

The system is designed for transmission of information from a first node to a plurality of second nodes. Each of the second nodes has a unique number associated with it. The system further comprises, at the first node, means for storing each of the unique numbers and for using a different one of the unique numbers to generate each of a plurality of second keys. Each of the second keys is usable only by the second node whose unique number was used to generate it.

The second key storage means at each second node stores a second key which is a function of the unique number associated with the second node of which the stored means forms a part. The second key is loaded into the second key storing means at the factory.

The key fragment set selection means preferably comprises means for periodically selecting key fragments to form the selected key fragment set. The second key fragment selection means preferably comprises means for periodically selecting second key fragments to form the second selected key fragment set. The selection of a key fragment set may take place relatively often and the selection of a second key fragment set may take place less often.

To these and to such other objects which may hereinafter appear, the present invention relates to a cryptographic system for use in a direct broadcast satellite network, as set forth in detail in the following specification and recited in the annexed claims, taken together with the accompanying drawings, wherein like numerals refer to like parts, and in which:

Figure 1:
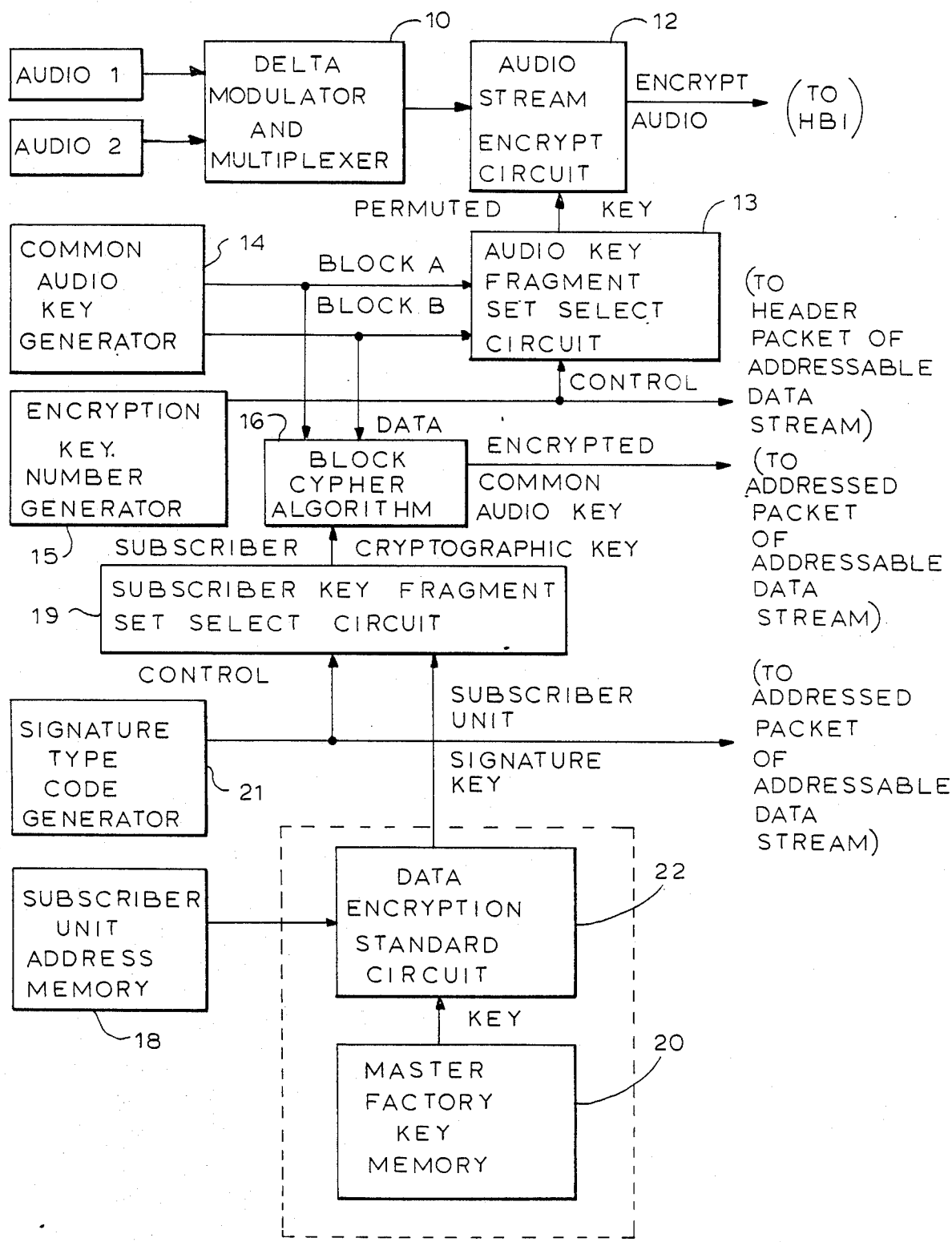
FIG. 1 is a functional diagram of the encryption system at the transmission end of the network.

The cryptographic system is described herein as designed for use in a pay television distribution network. However, the principles involved are applicable to other types of signal distribution systems where security is required. It employs three keys to provide security against unauthorized program viewing. A master factory key is arbitrarily chosen as a system constant. The master factory key is used in conjunction with an individual subscriber unit address to produce a second key, called a subscriber unit signature key, unique to each subscriber.

The common audio decryption key, is arbitrarily chosen to encrypt the audio signal at the transmission end. The common audio key is distributed to each authorized subscriber in individualized form through the use of the second key.

The common audio key preferably includes two key blocks, each composed of 40 bits or five 8-bit bytes, for example. One key block is designated as the current key block. A key fragment set of the five 8-bit bytes of the current block, arranged in a selected order (permuted common audio key) is used at a time for encryption and decryption. During the time when one key block is employed, the other key block may be varied. After the variation of the key block is completed, the new common audio key, containing the currently used key block and the varied key block is distributed to each subscriber unit to replace the old key. Upon command, the broadcast information begins to be encrypted with a selected key fragment set from the varied key block and all subscriber units are switched over to the key fragment set from the varied key block, at the same time. This new fragment set is used to construct the new permuted key for use in decryption.

A 5-bit encryption key number or code is used to define the order of the bytes forming the key fragment set of the current key block. The encryption key number is transmitted to all receivers at the same time in the header portion of the control data stream, as described below. Each version of the common audio key is distributed in its entirety in encrypted form to each receiver individually in an addressable packet in the control data stream.

The following table illustrates the structure of a typical 80-bit common audio key divided into blocks of five 8-bit bytes each:

TABLE I

| BIT REF 15 14 13 12 11 10 9 8 | 7 6 5 4 3 2 1 0 |
|---|---|
| BYTE 10 | BYTE 00 |
| BYTE 11 | BYTE 01 |
| BYTE 12 | BYTE 02 |
| BYTE 13 | BYTE 03 |
| BYTE 14 | BYTE 04 |
| BLOCK A | BLOCK B |

The following table defines the arrangement of the common audio key fragments from the current key block to form the various key fragment sets (permuted keys) in accordance with the encryption key number. "b" stands for the block (b=1 stands for Block A, and b=0 stands for block B) and can be 1 or 0, depending upon which block is designated as the current block:

TABLE II

| ENCRYPTION KEY NO. (5 bit) | | | | | BIT 39 | PERMUTED KEY (ALL ENTRIES ARE 8-BIT BYTE) | | | BIT 0 |
|---|---|---|---|---|---|---|---|---|---|
| b | 1 | 0 | 0 | 0 | b4 | b3 | b2 | b1 | b0 |
| b | 0 | 0 | 1 | 0 | b4 | b2 | b1 | b0 | b3 |
| b | 1 | 0 | 1 | 0 | b4 | b1 | b0 | b3 | b2 |
| b | 0 | 1 | 0 | 0 | b4 | b0 | b3 | b2 | b1 |
| b | 1 | 1 | 0 | 0 | b3 | b4 | b1 | b0 | b2 |
| b | 0 | 1 | 1 | 0 | b3 | b2 | b0 | b4 | b1 |
| b | 1 | 1 | 1 | 0 | b3 | b1 | b2 | b0 | b4 |
| b | 0 | 0 | 0 | 1 | b3 | b0 | b4 | b1 | b2 |
| b | 1 | 0 | 0 | 1 | b2 | b4 | b3 | b0 | b1 |
| b | 0 | 0 | 1 | 1 | b2 | b3 | b0 | b1 | b4 |
| b | 1 | 0 | 1 | 1 | b2 | b1 | b4 | b3 | b0 |
| b | 0 | 1 | 0 | 1 | b1 | b4 | b0 | b2 | b3 |
| b | 1 | 1 | 0 | 1 | b1 | b2 | b3 | b4 | b0 |
| b | 0 | 1 | 1 | 1 | b0 | b1 | b2 | b4 | b3 |
| b | 1 | 1 | 1 | 1 | b0 | b3 | b1 | b2 | b4 |
| b | 0 | 0 | 0 | 0 | NO ENCRYPTION | | | | |

The subscriber unit signature key stored in the receiver memory also contains more than one key fragment. Preferably, it contains seven 16-bit parts or fragments from which four 16-bit fragments are selected to construct a subscriber cryptographic key. This key is employed in encryption and decryption of the common audio key.

A 3-bit signature type or code is used to define the selection and the arrangement of the 16-bit key fragments used to construct the subscriber cryptographic key. The signature type code is transferred to the subscriber unit through the broadcast signal by means of an addressable packet.

The following table defines the relationship between the 3-bit signature type code and the selection and order of the four 16-bit fragment sets selected from the seven 16-bit fragments of the subscriber unit signature key. The numbers 1 through 7 correspond, respectively, to the seven 16-bit fragments or signature numbers:

TABLE III

| SIGNATURE TYPE | | | BIT 63 | SUBSCRIBER CRYPTOGRAPHIC KEY (ALL ENTRIES ARE 16-BIT SIGNATURES) | | BIT 0 |
|---|---|---|---|---|---|---|
| 0 | 0 | 1 | 7 | 6 | 5 | 4 |
| 0 | 1 | 0 | 6 | 5 | 4 | 3 |
| 0 | 1 | 1 | 5 | 4 | 3 | 2 |
| 1 | 0 | 0 | 4 | 3 | 2 | 1 |
| 1 | 0 | 1 | 3 | 2 | 1 | 7 |
| 1 | 1 | 0 | 2 | 1 | 7 | 6 |
| 1 | 1 | 1 | 1 | 7 | 6 | 5 |
| 0 | 0 | 0 | | NO ENCRYPTION | | |

Each version of the common audio key is first encrypted using the subscriber cryptographic key for a specific receiver unit as the key for a unique block cipher algorithm. The resulting encrypted common audio keys are distributed to the specific receiver unit by an addressed packet in an addressable data stream.

At the specific subscriber receiver unit, the received encrypted common audio key is decrypted using the unique block cipher algorithm and as a key, the subscriber cryptographic key which is constructed from a fragment set selected in accordance with the received signature type code, from the factory pre-loaded subscriber unit signature key. The permuted key, constructed from the fragment set selected in accordance with the received encryption key number from the current block key block of the decrypted common audio key, is then used to decrypt the audio signal.

An encrypted common audio key is periodically transmitted to each receiver unit, preferably at least once every transmission session and is stored in a memory in the receiver until a new common audio key is received. The block of the common audio key not being used for encryption can be varied during the time it is not in use for encrypting and decrypting so as to form a part of a new or replacement common audio key. The replacement key includes a current key block identical to that of the previous key and newly varied key block. It is encrypted and distributed for storage by each receiver unit. At the end of a transmission session, upon command, in the form of a new encryption key number indicating a set of fragments from the varied key block for use, all subscriber units switch from one block of the common audio key to the other. Thus, a replacement key can be installed without interruption of the operation of the system.

The integrity of the three key system depends on the effectiveness of the security measures employed to keep the master factory key safe from independent discovery or unauthorized use. In contrast to this, prior art systems of this type require that a unique key for each subscriber unit be protected at the transmission end. The present system provides comparable security, but eliminates the necessity for protecting a separate key for each subscriber unit. In the present system, only a single key, the master factory key, need be protected at the transmission end.

Since the direct broadcast satellite network in which the cryptographic system of the present invention is employed is designed to accommodate 2-3 million different subscriber receiver units, the necessity of previous cryptographic systems for protecting the different key for each subscriber unit is quite burdensome. The three key cryptographic system of the present invention eliminates this problem entirely as it requires only a single master factory key be protected.

The use of selectable key fragment sets enhances system agility by permitting the key fragment arrangement to be changed rapidly. The use of a common audio key consisting of two interchangeable key blocks, only one of which is used for decryption at a time, permits new keys to be distributed without interruption of the operation of the system.

Figure 4:
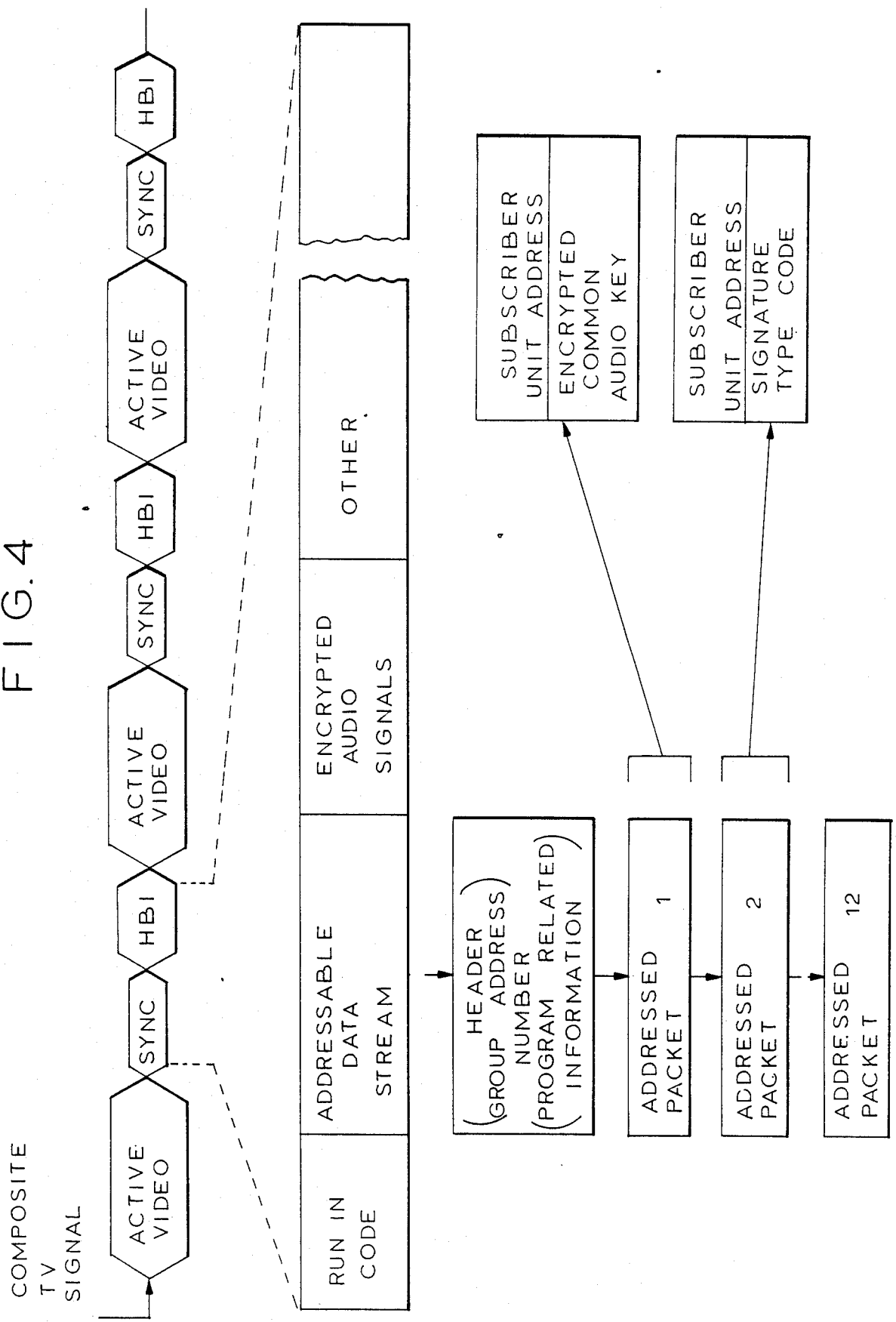
FIG. 4 is a schematic representation of the composite video signal over which the encrypted signals, key information, and control information are transmitted.

As seen in FIG. 1, which depicts the functions at the transmission end of the system, the audio channel inputs AUDIO 1 and AUDIO 2 form the inputs to a delta modulator and multiplexer 10 of conventional design. The digitized output from modulator 10 is encrypted in an audio stream encryption circuit 12. The output of encryption circuit 12 is the encrypted audio signal which forms a portion of a data stream. The data stream, illustrated in FIG. 4, is inserted into the horizontal blanking intervals (HBI) of the composite television signal which is transmitted via satellite from the transmission end to each of the subscriber receiver units.

The digitized audio signal is encrypted using a permuted key consisting of a selected key fragment set from a key block (designated as the current key block) obtained from the common audio key. Each common audio key is generated by a common audio key generation circuit 14. Each common audio key preferably consists of two key blocks (block A and block B). Each block includes five 8-bit bytes. The five bytes from the current key block are arranged in a key fragment set to construct the permuted key for encryption. The set of fragments selected from the common audio key, which forms the permuted key, are selected in accordance with a 5-bit encryption key number. One of the bits of the encryption key number defines the key block designated as the current key block. The remaining four bits define the arrangement of the five bytes of the current key block which form the permuted key. The bits of the encryption number defining the byte arrangement may be changed at any time and are preferably changed periodically, such as at the end of each hour of broadcasting. The bit, which defines the current key block can also be changed periodically, but usually less often, for example, at the end of each daily transmission session, after the non-designated key block has been varied and replacement common audio keys encrypted and distributed to each receiver.

A fragment set from the current key block of the common audio key is selected to construct the permuted key for use in encrypting circuit 12 by an audio key fragment set select circuit 13 Circuit 13 is controlled by a 5-bit encryption key number obtained from generator 15.

The entire common audio key (both blocks) is distributed in encrypted form to each individual subscriber unit prior to the beginning of a transmission session. The common audio key is encrypted differently for each unit. Each of the encrypted common audio keys is placed in a different addressed portion of the data stream. These portions of the data stream are addressed to an can be received only by the particular subscriber unit for which the encrypted common audio key is intended.

Each common audio key is formed by encrypting through the use of a 64-bit key, called the "subscriber cryptographic key", which is constructed of a fragment set selected from a subscriber unit signature key. The subscriber unit signature key preferably consists of several 16-bit fragments or signatures and is unique to a particular unit. The subscriber cryptographic key consists of four 16-bit fragments or signatures selected from the subscriber unit signature key in accordance with a 3-bit signature type code. Each distributed common audio key is formed by encrypting the common audio key using the subscriber cryptographic key in a block cipher algorithm circuit 16. The fragment set which forms the subscriber cryptographic key is selected in signature key fragment selection circuit 19 under the control of the signature type code from a signature type code generator 21. The signature type code can be changed periodically to alter the subscriber cryptographic key. The signature type code is transferred to each receiver in a packet addressed to the receiver.

Each unique subscriber unit signature key is a function of the subscriber unit address number for the receiver unit to which the portion of the data stream including the encrypted common audio key is addressed. More specifically, each unique subscriber unit signature key is derived by encrypting the subscriber unit address number, stored in a memory 18, using the master factory key, stored in a master factory key memory 20, in an encryption circuit 22 which employs the Data Encryption Standard algorithm.

During a particular transmission session, only the designated common audio key block is used for encrypting and decrypting. The non-designated key block may be varied during this time by common audio key generator 14. Varying the non-designated block will not effect the operation of the system. The varied key will be encrypted for each receiver unit as described above and then distributed. After distribution, the transmission session is ended and a new encryption key number is broadcast to all receivers simultaneously designating the newly varied block for use in encryption and decryption. In this way, distribution of replacement keys can take place over a period of hours, but the entire system switches to the replace key at the same time.

Figure 2:
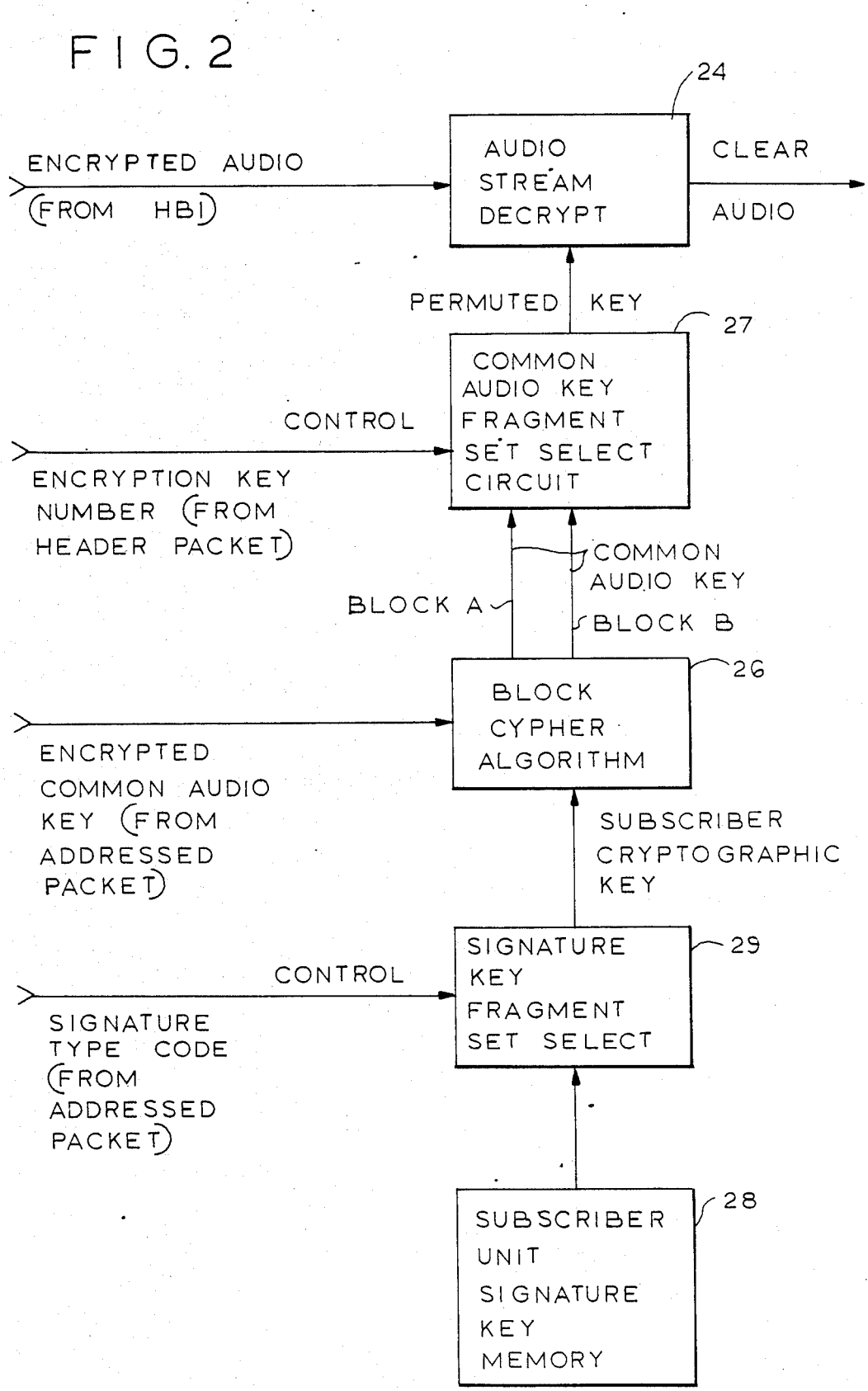
FIG. 2 is a functional diagram of the decryption system at each receiver terminal in the present invention.

As shown in FIG. 2, which depicts the functions of the subscriber receiver units, the transmitted composite television signal is received and the encrypted audio signal is extracted from the data stream in the horizontal blanking intervals and forms an input to an audio stream decryption circuit 24. The encrypted audio signal will be decrypted using the permuted key which is a selected fragment set from the current block of the common audio key. The common audio key is derived from the encrypted common audio key which is transmitted to the receiver.

The receiver monitors the data stream in the horizontal blanking intervals until it detects the portion thereof with its unique address number. The encrypted common audio key for the particular subscriber unit is then obtained from the addressed portion. The encrypted common audio key is decrypted in a block cipher algorithm circuit 26 such that common audio key blocks, block A and block B, are obtained in clear form. The key blocks are fed to a common audio key fragment set select circuit 27. Circuit 27 receives the encryption key number captured from the header portion of the data stream and uses same to select the appropriate key block and arrange the fragments thereof to construct the permuted key. The permuted key is then used in audio stream decryption circuit 24 to decrypt the audio stream.

A selected fragment set of the subscriber unit signature key for the particular subscriber unit is utilized to construct the subscriber cryptographic key for use in decryption of the common audio key in a block cipher algorithm circuit 26. The unique subscriber unit signature key for each subscriber unit is stored in a memory 28 within the unit at the factory.

Memory 28 is accessed and the subscriber unit signature key is entered into a signature key fragment set select circuit 29 which receives the signature type code captured from the addressed portion of the data stream. Circuit 29 selects and arranges the appropriate fragments to construct the subscriber cryptographic key.

Figure 3:
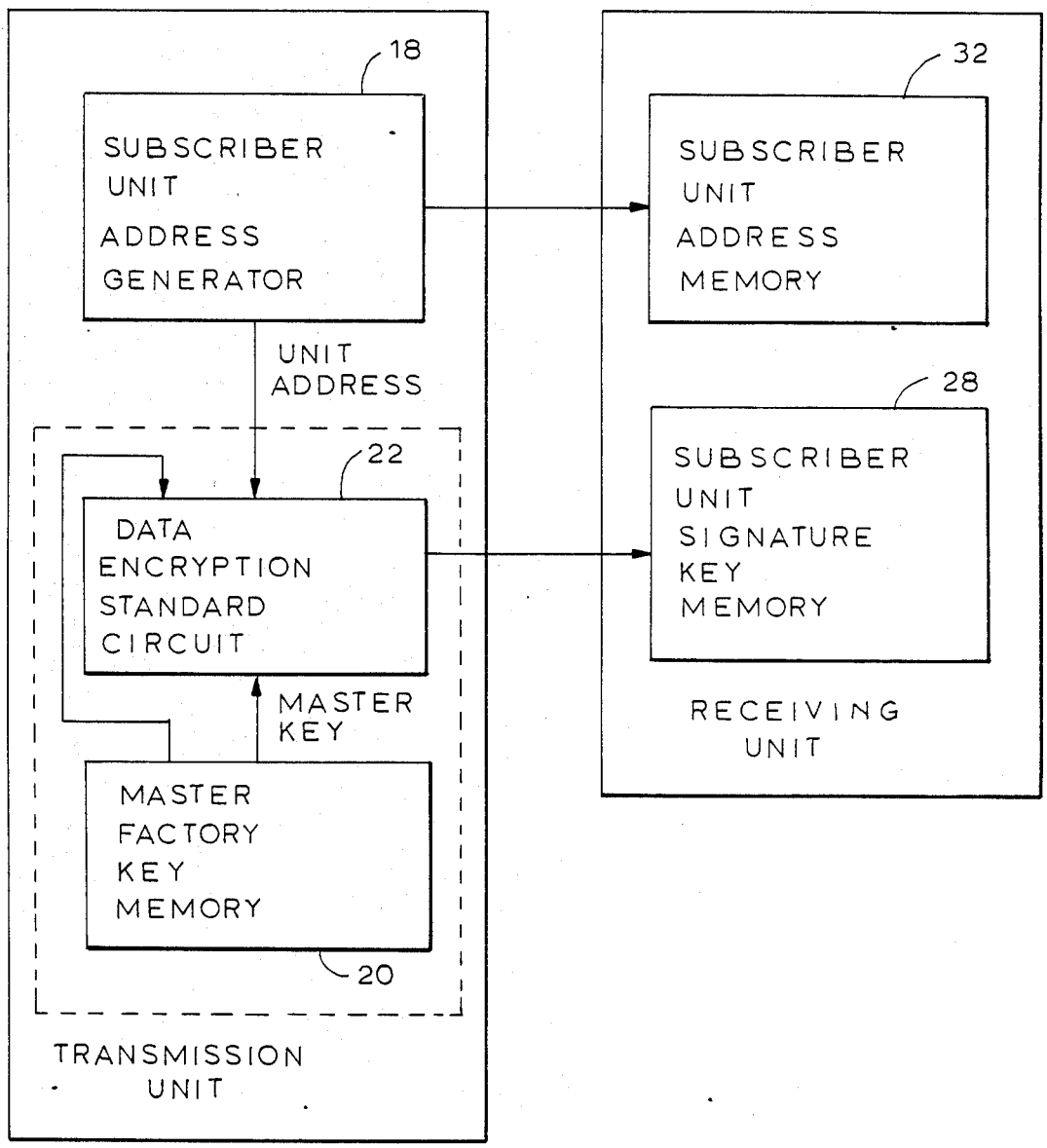
FIG. 3 is a functional diagram of the encoding system utilized at the factory in order to set the receiver terminal memories for decryption of the distributed signal.

FIG. 3 schematically depicts the factory encoding system. At the factory, the subscriber unit address is read from the subscriber unit address memory 18 and stored in the subscriber unit address memory 32 in the receiver. The subscriber unit address is encrypted in the Data Encryption Standard algorithm circuit 22 using the master factory key from memory 20 and is then stored in the subscriber unit signature key memory 28 in the receiver. Later, when signals are being transmitted, the master factory key from memory 20 is used in the Data Encryption Standard algorithm circuit 22 to generate the unique subscriber unit signature key for each subscriber unit, as described above.

FIG. 4 schematically represents the transmitted composite TV signal which comprises a plurality of active video portions, sync portions, and horizontal blanking portions. The data is stream inserted into each horizontal blanking portion.

The data stream includes a run-in code for synchronization, an addressable data stream portion, encrypted digitized audio signal.

The addressable data stream portion includes a header portion, containing information for addressing certain groups of receivers and certain program related information common to all receiving units in the addressed group, including the encryption key number. The addressable data stream portion also includes a plurality of addressed packets 1 . . . n, each containing the address number for a particular receiving unit. The addressed packets also contain the encrypted common audio key and the signature type code for the addressed receiver.

Each receiving unit captures encrypted audio information. It locates a header with its group number and stores the encryption key number therefrom. It then searches for addressed packets with its address number. When the packets with its address number are located, the unit obtains the signature type code and encrypted common audio key therein and uses them, in conjunction with the unique subscriber unit signature key stored in the unit, to obtain the common audio key blocks. The encryption key number from the header packet is then used to construct the permuted key.

Replacement common audio keys, with a varied key block, may be distributed and stored during the transmission session. Since the current key block is the same in the old key as it is in the replacement key, there is no discontinuity in operation as one key replaces the other. At the end of the transmission session, a new encryption key number is distributed to all receiving units at the same time in the header portion of the control data stream. The new encryption key number contains a first bit designating the varied key block as the then current key block, that is, the function of the key blocks is interchanged and the varied key block is now used for encryption and decryption. Accordingly, all receiving units switch over to the replacement key at the same time.

It will now be appreciated that the present invention relates to improvements in a multiple key cryptographic system which employs a cryptographic key composed of interchangeable key blocks to permit replacement keys to be installed in the receiving units without interruption of operation. The key permits a varied key block to be distributed over a relatively long time while the current key block is still in use and, thereafter switchover by all receiving units, upon a single command, in a relatively short time, to the replacement key. It also employs key fragments, the selection and arrangement of which can be changed periodically for increased agility. The use of changeable key fragment sets permits dynamic changes to occur periodically, enhancing the security of the system.

While only a single preferred embodiment of the present invention has been disclosed herein for purposes of illustration, it is obvious that many variations and modifications could be made thereto. It is intended to cover all of these variations and modifications which fall within the scope of the present invention, as defined by the following claims:

We claim:

1. A cryptographic system for the secured transmission of information between first and second nodes, comprising, at the first node; means for generating a key comprising more than one key fragment; means for selecting a set of one or more of the key fragments; means for generating data indicative of the selected key fragments; means for encrypting the information using the selected key fragment set; means for encrypting the key, said key encrypting means comprising means for generating a second key comprising more than one second key fragment; means for selecting a set of one or more of the second key fragments; means for encrytping said key with said selected set of second key fragments, means for generating second data indicative of the set of second key fragments selected; and means for transferring the encrypted information, encrypted key, select data and second data from the first node to the second node; and at the second node, means for decrypting the encrypted key, means for obtaining the selected key fragments set from the decrypted key in accordance with the transferred select data and means for decrypting the encrypted information using the obtained key fragments set.

2. The system of claim 1, wherein said key decryption means comprises means for storing the second key, means for obtaining the selected second key fragment set from the stored second key using the second data and means for decrypting the encrypted key using the obtained second key fragment set.

3. The system of claim 1, wherein said means for generating the second key comprises means for storing a third key, means for storing a number associated with the second node, and means for encrypting the number with the third key ot obtain the second key.

4. The system of claim 3, for transmission of information from a first node to a plurality of second nodes, wherein each of the second nodes has a unique number associated with it and further comprising, at the first node, means for storing each of the unique numbers and for using a different one of the unique numbers to generate each of a plurality of second keys, each of the second keys being usable only by the second node whose unique number was used to generate it.

5. The system of claim 4, wherein said key decryption means comprises means for storing the second key, means for obtaining the selected second key fragment set from the stored second key using the second data and means for decrypting the encrypted key using the obtained second key fragment set.

6. The system of claim 5, wherein said second key storing means stores a second key which is generated based on the unique number associated with the second node of which the storage means forms a part.

7. The system of claim 1, wherein said key fragment set selection means comprises means for periodically selecting different key fragment sets.

8. The system of claim 1, wherein said second key fragment selection means comprises means for periodically selecting different second key fragment sets.

9. The system of claim 1, wherein the selected key fragment set is changed relatively often and the second selected key fragment set is changed less often.

10. The system of claim 1, wherein the second key fragments comprise sets of bits.

11. A cryptographic system for the secure transmission of information between first and second nodes, comprising at the first node; means for selecting a set of one or more of the key fragments, said key fragment selection means comprising means for periodically selecting different arrangements of fragments to form the key fragment set, means for generating data indicative of the selected key fragment set, means for encrypting the information using the selected key fragments set; means for transferring the encrypted information, key, and select data from the first node to the second node; at the second node; means for obtaining the selected key fragment set for the transferred key in accordance with the transferred select data; and means for decrypting the encrypted information using the obtained key fragment set.

12. A cryptographic system for the secure transmission of information between first and second nodes, comprising, at the first node; means for generating a key comprising more than one key fragment, said key fragments comprising bytes; means for selecting a set of one or more of the key fragments; means for generating data indicative of the selected key fragments in said set; means for encrypting the information using the selected key fragments in said set; means for transferring the encrypted information, key, and select data from the first node to the second node; and at the second node: means for obtaining the selected key fragments said of the transferred key in accordance with the transferred selected data; and means for decrypting the encrypted information using the obtained key fragments set.

13. A cryptographic system for the secure transmission of information between first and second nodes comprising, at the first node, means for generating a key comprising first and second blocks, each block comprising more than one key fragment, means for designating one of the key blocks as the current key block for encryption and decryption, means for selecting one or more key fragments of the current key block to form a key fragment set, means for varying the second key block, said designating means designating the second key block as the then current key block after same has been varied, means for generating data indicative of the selected key fragment set from the then current key block, means for encrypting information using the selected key fragment set of the then current key block, means for transferring the encrypted information, key and data to the second node, and, at the second node, means for obtaining the selected key fragment set of the then current key block from the transferred key in accordance with the transferred data and means for decrypting the encrypted information using the obtained selected key fragment set.

14. The system of claim 13, wherein said first key block is designated as the current key block during a first transmission session and said second key block is designated as the current key block during a second transmission session.

15. The system of claim 13, further comprising means, at the first node, for encrypting the key to form the key information and means, at the second node, for decrypting the key information.

16. The system of claim 15, wherein said key encryption means comprises means for generating a second key comprising more than one second key fragment; means for selecting one or more of the second key fragments to form a second key fragment set; means for generating second data indicative of the second key fragment set selected; means for encrypting the key with said selected set of second key fragments; and means for transferring the second data from the first node to the second node.

17. The system of claim 16, wherein said key decryption means comprises means for storing the second key, means for obtaining the selected second key fragment set from the stored second key using the second data and means for decrypting the encrypted key using the obtained second key fragment set.

18. The system of claim 16, wherein said means for generating the second key comprises means for storing a third key, means for storing a number associated with the second node and means for encrypting the number with the third key to obtain the second key.

19. The system of claim 18, for transmission of information from a first node to a plurality of second nodes, wherein each of the second nodes has a unique number associated with it and further comprising, at the first node, means for storing each of the unique numbers and for using a different one of the unique numbers to generate each of a plurality of second keys, each of the second keys being usable only by the second node whose unique number was used to generate.

20. The system of claim 13, wherein said key fragment set selection means comprises means for periodically selecting different key fragments to form the key fragment set.

21. The system of claim 16, wherein said second key fragment set selection means comprises means for periodically selecting different second key fragments to form the second key fragment set.

22. A receiver for use in a system broadcasting information of the type comprising an encrypted key including more than one key fragment, data indicative of a key fragment set selected from the key, information encrypted using the selected set of key fragments indicated by the data, second data indicative of a key fragment set selected from a second key comprising more then one fragment, the receiver comprising means for receiving the key in encrypted form, data and encrypted information, means for obtaining the selected set of key fragments from the received key in accordance with the received data, means for decrypting the received information using the obtained selected key fragment set, a memory for storing a second key and means for using the stored second key to decrypt the received key fragment, comprising means for obtaining the second key fragment set from the stored second key in accordance with the second data and for using the obtained second key fragment set in decrypting the key information.

23. The receiver of claim 22, wherein said fragments are bytes.

24. A receiver for use in a system broadcasting information of the type comprising key information including a key with first and second blocks, each having more than one fragments, one of the blocks being designated as the current key block for encrypting and decrypting during a period in which the other block is varied and, thereafter, the second block being designated as the current key block, data indicative of a key fragment set selected from the then current key block and information encrypted using the selected set of fragments indicated by the data, the receiver comprising means for receiving the key information, data and encrypted information, means for obtaining, from the received key information, the selected key fragment set in accordance with the received data and means for decrypting the received information using the obtained selected key fragment set.

25. The receiver of claim 24, wherein the key information is received in encrypted form and further comprising a memory for storing a second key and means for using the second key to decrypt the received key information.

26. The receiver of claim 25, wherein the second key comprises more than one fragment wherein the broadcast signal comprises second data indicative of a selected set of fragments from the second key and wherein said means for using the second key to decrypt the received key information comprises means for obtaining the second key fragment set from the stored second key in accordance with the second data and for using the obtained second key fragment set in decrypting the key information.

27. The receiver of claim 24, wherein said first key block is designated as the current key block during a first transmission session and said second key block is designated as the current key block during a second transmission session.

28. The receiver of claim 24, wherein the blocks comprise sets of bytes.

29. A cryptographic method for the secure transmission of information between first and second nodes comprising the steps of, at the first node, generating a key comprising more than one key fragment, selecting one or more of the key fragments to form the set, generating data indicative of the selective key fragments set, encrypting the information to be transmitted using the selected key fragment set, encrypting the key, the step of encrypting the key comprising the steps of generating a second key comprising more than one key fragment, selecting one or more of the second key fragments to form a second set, encrypting the key with the selected set of second key fragments generating second data indicative of the selected second key fragment set, transferring the encrypted information, encrypted key, data and second data from the first node to the second node and, at the second node, obtaining the selected key fragment set from the transferred encrypted key in accordance with the transferred data, decrypting the encrypted key and decrypting the information using the obtained key fragment set.

30. The method of claim 56, wherein the step of decrypting the key information includes the steps of storing the second key, obtaining the selected second key fragment set from the stored second key using the second data and decrypting the encrypted key using the obtained second key fragment set.

31. A method for changing keys in a cryptographic system for transmitting information from a first node to a plurality of second nodes, the method comprising the steps of: generating a first key comprising first and second blocks, selecting said first block of the first key for use in encrypting and decrypting, encrypting the information to be transmitted with the first key block; generating a second key comprising first and second blocks in which said first block is identical to the first block of the first key; transmitting the encrypted information to each of the second nodes, distributing the first key to each of the second nodes to permit decryption of the transmitted information with the first block, distributing the second key to each of the second nodes for substitution for the first key, distributing to each of the second nodes a signal causing each of the second nodes to switch from said first block of said second key to said second block of said second key for decryption of the transmitted information as the second block of the second key is substituted for the first block of the first key for encryption of the information to be transferred.

* * * * *